United States Patent
Militano et al.

(10) Patent No.: US 9,575,157 B2
(45) Date of Patent: *Feb. 21, 2017

(54) LINE OF SIGHT (LOS) DETECTION IN A CELLULAR COMMUNICATIONS NETWORK

(71) Applicant: Telefonaktiebolaget L M Ericsson (publ), Stockholm (SE)

(72) Inventors: Francesco Militano, Solna (SE); Jan-Erik Berg, Sollentuna (SE); Konstantinos Dimou, San Francisco, CA (US)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 14/826,389

(22) Filed: Aug. 14, 2015

(65) Prior Publication Data
US 2015/0346318 A1 Dec. 3, 2015

Related U.S. Application Data

(63) Continuation of application No. 13/886,886, filed on May 3, 2013, now Pat. No. 9,113,350.

(51) Int. Cl.
*H04W 4/00* (2009.01)
*G01S 5/14* (2006.01)
(Continued)

(52) U.S. Cl.
CPC ............... *G01S 5/14* (2013.01); *G01S 5/0257* (2013.01); *G01S 11/06* (2013.01); *H04W 4/023* (2013.01);
(Continued)

(58) Field of Classification Search
CPC .... H04W 64/00; H04W 36/30; H04W 64/003; H04W 4/028; H04W 24/02
(Continued)

(56) References Cited

U.S. PATENT DOCUMENTS 8,103,228 B2   1/2012  Monat et al.
9,113,350 B2   8/2015  Militano et al.
(Continued)

FOREIGN PATENT DOCUMENTS

KR      20100030662 A      3/2010

OTHER PUBLICATIONS

Author Unknown, "Technical Specification Group Radio Access Network; Evolved Universal Terrestrial Radio Access (E-UTRA); Radio Resource Control (RRC); Protocol specification (Release 11)," Technical Specification 36.331, Version 11.3.0, 3GPP Organizational Partners, Mar. 2013, 344 pages.
(Continued)

*Primary Examiner* — Vladimir Magloire
*Assistant Examiner* — Jaime Holliday
(74) *Attorney, Agent, or Firm* — Withrow & Terranova, PLLC

(57) ABSTRACT

Systems and methods for detecting a Line of Sight (LOS) in a cellular communications network are provided. In one embodiment, a network node in the cellular communications network determines whether a wireless device is within LOS of a base station. In order do so, the network node compares a Ricean factor of a wireless communications channel between the base station and the wireless device and a predetermined Ricean factor threshold for LOS detection. In addition, the network node compares a Root Mean Squared Error (RMSE) between a Rayleigh probability density function and samples of received signal strength for radio signals transmitted between the base station and the wireless device and a predetermined RMSE threshold for LOS detection. The network node then determines whether the wireless device is within LOS of the base station based on results of the comparisons.

12 Claims, 5 Drawing Sheets

(51) Int. Cl.
*G01S 5/02* (2010.01)
*H04W 24/02* (2009.01)
*H04W 24/08* (2009.01)
*G01S 11/06* (2006.01)
*H04W 4/02* (2009.01)
*H04W 88/08* (2009.01)

(52) U.S. Cl.
CPC ............. *H04W 24/02* (2013.01); *H04W 24/08* (2013.01); *H04W 4/028* (2013.01); *H04W 88/08* (2013.01)

(58) Field of Classification Search
USPC .............................. 455/421, 422.1–425, 506
See application file for complete search history.

(56) References Cited

U.S. PATENT DOCUMENTS

| | | | | |
|---|---|---|---|---|
| 2003/0087604 | A1* | 5/2003 | Stein | G01S 5/0205 455/65 |
| 2009/0209271 | A1* | 8/2009 | Reed | G01S 5/02 455/456.6 |
| 2010/0103868 | A1 | 4/2010 | Meng et al. | |
| 2011/0268097 | A1* | 11/2011 | Agrawala | G01S 5/021 370/338 |
| 2012/0225665 | A1 | 9/2012 | Alexander et al. | |
| 2013/0196670 | A1* | 8/2013 | Kim | H04W 36/0083 455/440 |
| 2014/0329520 | A1 | 11/2014 | Militano et al. | |

OTHER PUBLICATIONS

Lakhzouri, Abdelmonaem, "Channel Estimation and Mobile Phone Positioning in CDMA Based Wireless Communication Systems," Tampere University of Technology, Department of Technology, Institute of Communications Engineering, Jan. 1, 2005, pp. 1-91.

Muhi-Eldeen, Z. et al., "Performance Analysis of Reflection Paths for Millimeter Wavelength Systems," IEEE International Conference on Computer Systems and Applications, AICCSA, Amman, May 13-16, 2007, pp. 139-145.

O'Hollaren, John et al., "Incremental Multi-Robot Deployment for Line-of-Sight Chains Using Only Radio Signal Strength," Ohollaren.com, Retrieved: 2013, www.ohollaren.com/attachments/icra10-ws.pdf, 5 pages.

Yarkan, Serhan et al., "Identification of LOS and NLOS for Wireless Transmission," Proceedings of IEEE Cognitive Radio Oriented Wireless Networks and Communications, vol. 1, Mykonos Islands, Greece, Jun. 8-10, 2006, pp. 1-5.

International Search Report and Written Opinion for PCT/IB2014/061138, mailed Dec. 15, 2014, 11 pages.

Notice of Allowance for U.S. Appl. No. 13/886,886, mailed May 12, 2015, 9 pages.

* cited by examiner

LINE OF SIGHT (LOS) DETECTION IN A CELLULAR COMMUNICATIONS NETWORK

RELATED APPLICATIONS

This application is a continuation of U.S. patent application Ser. No. 13/886,886, filed May 3, 2013, the disclosure of which is hereby incorporated herein by reference in its entirety.

FIELD OF THE DISCLOSURE

The present disclosure relates to Line of Sight (LOS) detection and more particularly relates to LOS detection in a cellular communications network.

BACKGROUND

Cellular communications networks enable wireless communication for various types of wireless devices. Positioning of wireless devices within a cellular communications network has many emerging applications ranging from security and emergency services to environmental monitoring to command and control. While technologies such as the Global Positioning System (GPS) have enabled accurate positioning of wireless devices in most environments, there are still many challenging environments in which positioning of wireless devices is difficult (e.g., inside buildings, inside tunnels, etc.). In these challenging environments, positioning of a wireless device can be determined by estimating different parameters of a radio signal received by the wireless device such as a Time of Arrival (TOA) of the radio signal, a Direction of Arrival (DOA) of the radio signal, and a Received Signal Strength (RSS) of the radio signal. The accuracy of TOA and DOA-based positioning techniques is greater than that of other techniques such as RSS-based positioning techniques.

One issue with TOA and DOA-based positioning techniques is multi-path propagation, or scattering, of the received radio signal. As a result of multi-path propagation, multiple versions of the radio signal arrive at the receiver via multiple different radio propagation paths. Each of these radio propagation paths has different characteristics (e.g., different time delays). Utilization of TOA and DOA-based positioning techniques in a multi-path environment requires a Line of Sight (LOS) path between the transmitter and the receiver.

Several mechanisms exist for detecting LOS in robotics and direct point-to-point wireless systems. In particular, a paper entitled "Incremental Multi-Robot Deployment for Line of Sight Chains Using Only Radio Signal Strength" by John O'Hollaren and Dylan Shell presented at the International Conference on Robotics and Automation (ICRA) 2010 Multi Robot Autonomy Workshop describes a technique for determining whether two robots that are equipped with wireless radios are within LOS of one another using signal statistics from the wireless radios. In particular, the paper teaches that a Root Mean Square Error (RMSE) between a Rayleigh Probability Density Function (PDF) and Received Signal Strength Indicator (RSSI) measurements for the received radio signal at the wireless device of one of the robots is a good indicator of LOS or non-LOS. In particular, a low RMSE is a good indicator of LOS, whereas a large RMSE is a good indicator of non-LOS.

Further, U.S. Patent Application Publication No. 2012/0225665, entitled CHARACTERIZATION OF A WIRELESS COMMUNICATIONS LINK, teaches making a LOS determination based on known locations of a transmitter and a receiver, a known transmit power of the transmitter, and a known received power at the receiver. Using this information, an observed path loss is calculated and compared to a modeled path loss. If a difference between the observed path loss and the modeled path loss is small, then a determination is made that there is a LOS path between the transmitter and the receiver. A bypass mode is also taught wherein, if a distance between the transmitter and the receiver is small, the path between the transmitter and the receiver is presumed to be a LOS path.

However, prior mechanisms for detecting LOS, such as the ones discussed above, are not reliable in all situations. For example, the technique taught in the O'Hollaren paper is not reliable under a low mobility scenario unless a large number of RSSI measurements are used. A large number of RSSI measurements leads to complex processing at the receiver, which is not desirable in many applications. The technique taught by U.S. Patent Application Publication No. 2012/0225665 requires a known location for both the transmitter and the receiver and, as such, is not reliable in scenarios where the location of the transmitter and/or the location of the receiver are not known (e.g., an application where LOS detection is part of a positioning process to determine a position, or location, of the transmitter or the receiver). Further, as a result of the issues noted above, prior mechanisms cannot be used to reliably detect LOS in all scenarios that are often encountered in complex environments such as a modern cellular communications network, which have various mobility, distance, and propagation scenarios. As such, there is a need for systems and methods for reliably detecting LOS in a cellular communications network.

SUMMARY

Systems and methods for detecting Line of Sight (LOS) in a cellular communications network are provided. In one embodiment, a network node in the cellular communications network determines whether a wireless device is within LOS of a base station of the cellular communications network. In order do so, the network node compares (i) a Ricean factor of a wireless communications channel between the base station and the wireless device with (ii) a predetermined Ricean factor threshold for LOS detection. In addition, the network node compares (i) a Root Mean Squared Error (RMSE) between a Rayleigh PDF and samples of a received signal strength for radio signals transmitted between the base station and the wireless device with (ii) a predetermined RMSE threshold for LOS detection. The network node then determines whether the wireless device is within LOS of the base station based on results of the comparisons. By utilizing results of both of the comparisons, LOS detection is provided with substantially improved accuracy.

In one embodiment, a best-fit analysis is performed to select the Rayleigh PDF from a set of Rayleigh PDFs for different maximum likelihood values based on the samples of the received signal strength for the radio signals transmitted between the base station and the wireless device. In this manner, a Rayleigh PDF that best fits to the Rayleigh distribution of Non Line of Sight (NLOS) channels in this specific environment is selected and utilized for the comparison, which in turn improves an accuracy of the LOS path detection.

In another embodiment, a network node in the cellular communications network determines whether a wireless device is within LOS of a base station of the cellular communications network. In order do so, the network node compares a Ricean factor of a wireless communications channel between the base station and the wireless device with a predetermined Ricean factor threshold for LOS detection. In addition, the network node compares an RMSE between a Rayleigh PDF and samples of a received signal strength for radio signals transmitted between the base station and the wireless device with a predetermined RMSE threshold for LOS detection. Still further, the network node compares a correlation of corresponding received signals from two antennas of the base station for a radio signal transmitted from the wireless device to a predetermined correlation threshold for LOS detection. The network node then determines whether the wireless device is within LOS of the base station based on results of the comparisons.

In another embodiment, a network node in the cellular communications network determines whether a wireless device is within LOS of a base station of the cellular communications network. In order do so, the network node compares (i) a Ricean factor of a wireless communications channel between the base station and the wireless device with (ii) a predetermined Ricean factor threshold for LOS detection. In addition, the network node compares (i) an RMSE between a Rayleigh PDF and samples of a received signal strength for radio signals transmitted between the base station and the wireless device with (ii) a predetermined RMSE threshold for LOS detection. Still further, the network node compares a received signal strength for a radio signal transmitted between the base station and the wireless device and a predetermined received signal strength threshold for LOS detection. The network node then determines whether the wireless device is within LOS of the base station based on results of the comparisons.

In another embodiment, a network node in the cellular communications network determines whether a wireless device is within LOS of a base station of the cellular communications network. In order do so, the network node compares (i) a Ricean factor of a wireless communications channel between the base station and the wireless device with (ii) a predetermined Ricean factor threshold for LOS detection. In addition, the network node compares (i) an RMSE between a Rayleigh PDF and samples of a received signal strength for radio signals transmitted between the base station and the wireless device with (ii) a predetermined RMSE threshold for LOS detection. Still further, the network node compares (i) a timing advance value for uplink transmissions from the wireless device to the base station with (ii) a predetermined timing advance threshold for LOS detection. The network node then determines whether the wireless device is within LOS of the base station based on results of the comparisons.

In another embodiment, a network node in the cellular communications network determines whether a wireless device is within LOS of a base station of the cellular communications network. In order do so, the network node compares (i) a Ricean factor of a wireless communications channel between the base station and the wireless device with (ii) a predetermined Ricean factor threshold for LOS detection. In addition, the network node compares (i) an RMSE between a Rayleigh PDF and samples of a received signal strength for radio signals transmitted between the base station and the wireless device with (ii) a predetermined RMSE threshold for LOS detection. Still further, the network node compares (i) a physical distance between the base station and the wireless device with (ii) a predetermined distance threshold for LOS detection. The network node then determines whether the wireless device is within LOS of the base station based on results of the comparisons.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
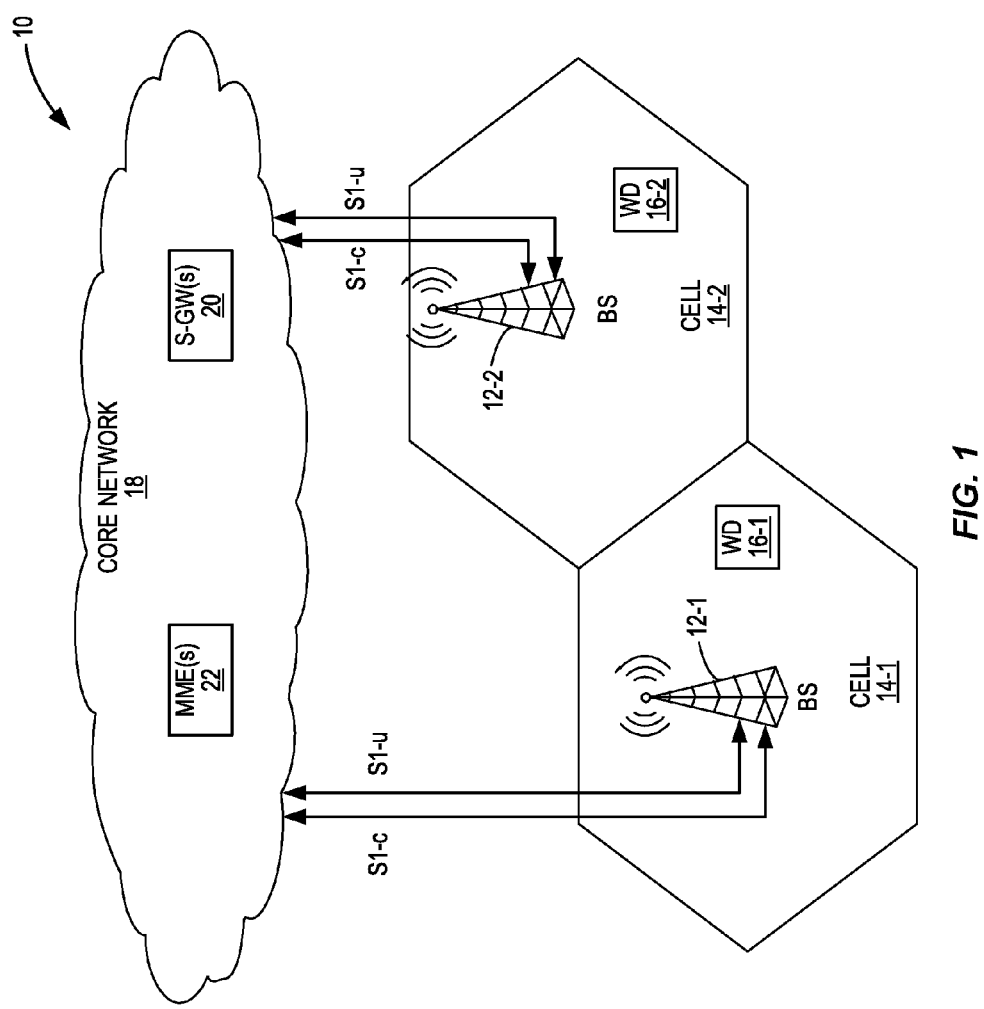
FIG. 1 illustrates a cellular communications network according to one embodiment of the present disclosure.

Systems and methods for detecting Line of Sight (LOS) in a cellular communications network are provided. In this regard, FIG. 1 illustrates a cellular communications network 10 according to one embodiment of the present disclosure. In this particular embodiment, the cellular communications network 10 is a 3$^{rd}$ Generation Partnership Project (3GPP) Long Term Evolution (LTE) cellular communications network and, as such, some of the terminology used herein may be specific to 3GPP LTE cellular communications networks. However, the present disclosure is not limited to 3GPP LTE cellular communications networks. Rather, the systems and methods disclosed herein may be utilized in any type of cellular communications network.

As illustrated in FIG. 1, the cellular communications network 10 includes a Radio Access Network (RAN), which includes base stations (BSs) 12-1 and 12-2 (more generally referred to herein collectively as base stations 12 and individually as base station 12) that serve corresponding cells 14-1 and 14-2 (more generally referred to herein collectively as cells 14 and individually as cell 14) of the cellular communications network 10. In this example, the base stations 12-1 and 12-2 are macro base stations (e.g., eNodeBs in a 3GPP LTE cellular communications network). However, one or both of the base stations 12-1 and 12-2 may alternatively be a micro, or low-power, base station (e.g., a femto or pico base station). The base station 12-1 serves wireless devices, such as a wireless device (WD) 16-1, located in the cell 14-1. As such, the base station 12-1 is referred to herein as a serving base station 12-1 of the wireless device 16-1. In a similar manner, the base station 12-2 serves wireless devices, such as a wireless device 16-2, located in the cell 14-2. As such, the base station 12-2 is referred to herein as a serving base station 12-2 of the wireless device 16-2. The wireless devices 16-1 and 16-2 are generally referred to herein as wireless devices 16. The wireless devices 16 may be mobile devices (e.g., mobile terminals) or stationary devices. Some examples include mobile phones, mobile smart phones, tablet computers, notebook computers, or the like. One or more of the wireless devices 16 may alternatively be wireless sensors, which may be mobile or stationary. As used herein, a wireless sensor is a general term that refers to any kind of Machine Type Communication (e.g., a video camera installed in an automobile, a temperature sensor, an alarm, an activator, etc.). Notably, while only two base stations 12-1 and 12-2 and two wireless devices 16-1 and 16-2 are illustrated in FIG. 1 for clarity and ease of discussion, it will be readily appreciated that the cellular communications network 10 includes numerous base stations 12 and numerous wireless devices 16.

The cellular communications network 10 also includes a core network 18 that includes one or more Serving Gateways (S-GWs) 20 and one or more Mobility Management Entities (MMEs) 22. In LTE, the base stations 12-1 and 12-2 are connected to the same or different S-GWs 20 via corresponding S1-u connections and connected to the same or different MMEs 22 via corresponding S1-c connections. Similarly, in this embodiment, the base stations 12-1 and 12-2 may be connected to one another via an X2 connection. The S-GWs 20 are user plane nodes connecting the core network 18 to the RAN. Among other things, the S-GWs 20 serve as mobility anchors when wireless devices, such as the wireless devices 16-1 and 16-2, move between cells as well as mobility anchors for other 3GPP technologies (e.g., Global System for Mobile Communications (GSM)/General Packet Radio Service (GPRS) and High Speed Packet Access (HSPA)). The MMEs 22 are control plane nodes of the core network 18. The responsibilities of the MMEs 22 include connection/release of bearers to wireless devices, handling of idle to active transitions, and handling of security keys.

Figure 2A:
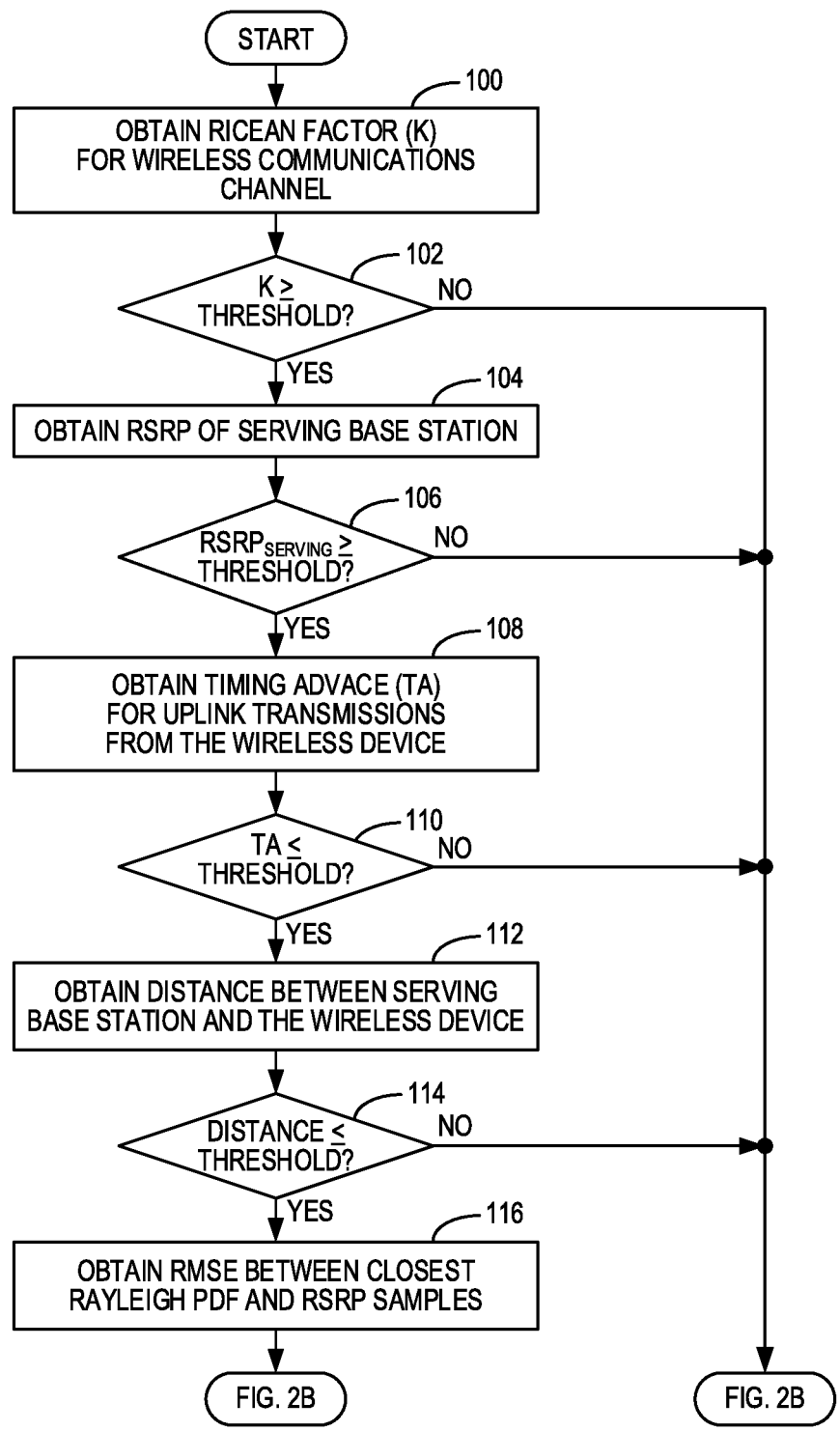
FIGS. 2A and 2B depict a flow chart that illustrates the operation of a network node in the cellular communications network of FIG. 1 to determine whether a wireless device is within Line of Sight (LOS) of a base station according to one embodiment of the present disclosure.
Figure 2B:
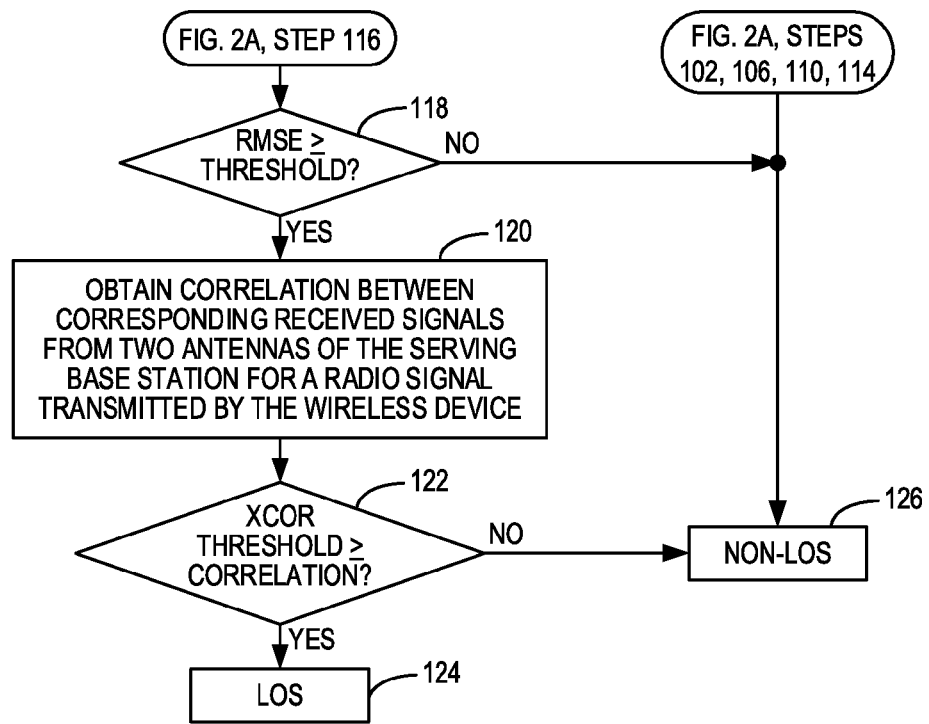

As discussed below in detail, the cellular communications network 10 performs a number of operations to determine whether a wireless device (e.g., the wireless device 16-1) is within LOS of a base station (e.g., the base station 12-1). In this regard, FIGS. 2A and 2B depict a flow chart that illustrates a process performed by a network node of the cellular communications network 10 to determine whether a wireless device 16 is within a LOS of a base station 12. Preferably, the network node is the base station 12. However, the present disclosure is not limited thereto. For this example, it is assumed that the network node is the base station 12-1 and the wireless device 16 is the wireless device 16-1 such that the base station 12-1 determines whether the wireless device 16-1 is within LOS of the base station 12-1. By leveraging measurements and capabilities that are available by virtue of the role of the base station 12-1 in the cellular communications network 10, the base station 12-1 is enabled to make a significantly more accurate determination of LOS or non-LOS than can be made in a direct point-to-point wireless system (e.g., a direct point-to-point wireless link between two devices). It should be noted that the steps illustrated in FIGS. 2A and 2B can be performed in any order. As such, the process is not limited to the ordering of the steps illustrated in FIGS. 2A and 2B. Lastly, as discussed below, not all steps are necessary.

In this example, the base station 12-1 first obtains a Ricean factor (K) for a wireless communications channel between the base station 12-1 and the wireless device 16-1 (step 100). More specifically, Ricean fading is a stochastic model for radio propagation when one component of a multi-path signal, which is typically a LOS signal, is a dominant component of the multi-path signal. In contrast, Rayleigh fading is a specialized model for stochastic fading when there is no dominant component (i.e., when there is no LOS signal). A Ricean fading channel can be described by two parameters, namely, the Ricean factor (K) and a total power ($\Omega$). The Ricean factor (K) is defined as a ratio of a signal power in a dominant component of a multi-path signal over a scattered power (i.e., a local-mean of signal power in all other components of the multi-path signal). The total power ($\Omega$) is the total power for both the dominant component and all other components (i.e., the scattered components) of the multi-path signal.

In one embodiment, the wireless communications channel is an uplink channel from the wireless device 16-1 to the base station 12-1, and the base station 12-1 obtains the Ricean factor (K) by determining the Ricean factor (K) for the uplink channel using any suitable technique. In another embodiment, the wireless communications channel is a downlink channel from the base station 12-1 to the wireless device 16-1 where the wireless device 16-1 determines the Ricean factor (K) and sends the Ricean factor (K) to the base station 12-1. Alternatively, the wireless device 16-1 determines the signal power in the dominant component and the signal powers in the scattered components (or alternatively total power of the scattered components) and sends this information to the base station 12-1. The base station 12-1 can then compute the Ricean factor (K) based on the information from the wireless device 16-1.

Next, the base station 12-1 determines whether the Ricean factor (K) for the wireless communications channel is greater than or equal to a predetermined Ricean factor (K) threshold for LOS detection (step 102). In general, a large Ricean factor (K) is an indicator that it is likely that the wireless device 16-1 is within LOS of the base station 12-1. Conversely, a small Ricean factor (K) is an indicator that it is unlikely that the wireless device 16-1 is within LOS of the base station 12-1. The predetermined Ricean factor (K) threshold is set such that if the Ricean factor (K) is greater than the predetermined Ricean factor (K) threshold, then it is more likely than not that there is a LOS path between the base station 12-1 and the wireless device 16-1. Further, the Ricean factor (K) threshold may be fine tuned to provide a desired confidence level (e.g., 50%, 60%, 70%, 80%, or 90%). Note that as the confidence level increases, the number of false positives decreases but the number of false negatives increases (i.e., the number of incorrect LOS detections decreases but the number of incorrect non-LOS detections increases). Thus, the selection of the Ricean factor (K) threshold can vary depending on the particular implementation. As one example, the Ricean factor (K) threshold is set to 10.

If the Ricean factor (K) for the wireless communications channel is not greater than or equal to the predetermined Ricean factor (K) threshold, then the process proceeds to step 126 as discussed below. However, if the Ricean factor (K) is greater than or equal to the predetermined Ricean factor (K) threshold, then the base station 12-1 obtains a Reference Signal Received Power (RSRP) value for the base station 12-1 (step 104). In LTE, the RSRP value is a measurement made by the wireless device 16-1 for a received power of a reference signal transmitted by the base station 12-1. The wireless device 16-1 reports the measured RSRP value to the base station 12-1 using conventional reporting techniques. Note, however, that step 104 is not limited to the RSRP value for the base station 12-1. Any value that is indicative of a radio distance between the base station 12-1 and the wireless device 16-1 may be used. For example, a Received Strength of Signal Indicator (RSSI) measured at the base station 12-1 for a transmission from the wireless device 16-1 or a RSSI measured at the wireless device 16-1 for a transmission from the base station 12-1 may alternatively be used.

Before proceeding, it should be noted that the Ricean factor (K) (and thus steps 100 and 102) may not be used in some scenarios or embodiments. For example, if variations in the wireless communications channel over time are small, then the Ricean factor (K) may not be valid. The variations in the wireless communications channel over time are small if, for example, the wireless device 16-1 is a stationary device or is a mobile device that is, for the moment, stationary. In this case, the Ricean factor (K) may be determined to be large without there being a LOS path between the base station 12-1 and the wireless device 16-1. As such, steps 100 and 102 may not be performed or may be determined by the base station 12-1 to be invalid. In one particular embodiment, the base station 12-1 detects or otherwise obtains information that is indicative of a mobility of the wireless device 16-1. If the wireless device 16-1 has low or no mobility, then the base station 12-1 either skips steps 100 and 102 or invalidates the result of step 100 and/or step 102 such that the procedure proceeds to step 104.

Next, the base station 12-1 compares the RSRP value of the base station 12-1 ($RSRP_{SERVING}$) to a predetermined RSRP threshold for LOS detection (step 106). The RSRP threshold for LOS detection is set such that, if the RSRP value of the base station 12-1 is greater than or equal to the predetermined RSRP threshold for LOS detection, then it is likely that the wireless device 16-1 is within LOS of the base station 12-1. In one embodiment, the predetermined RSRP threshold for LOS detection is associated with a path loss (PL) of a link from the base station 12-1 to the wireless device 16-1. An estimation of the PL can be made by considering a transmission power level of the base station 12-1. More specifically, for LTE, the base station 12-1 knows the transmission power level for Cell-specific Reference Symbols (CRS) transmitted by the base station 12-1 and can utilize this information to estimate the PL between the base station 12-1 and the wireless device 16-1 upon consideration of an RSRP measurement report from the wireless device 16-1. For example, the PL can be defined as:

$$PL = TxPower_{BS} + AntennaGain_{BS} - RSRP_{SERVING} + \epsilon$$

where $TxPower_{BS}$ is the transmit power level for the CRS transmitted by the base station 12-1, $AntennaGain_{Bs}$ is an antenna gain of the base station 12-1, $RSRP_{SERVING}$ is the RSRP measurement reported by the wireless device 16-1 for the base station 12-1, and $\epsilon$ is a correction value. The RSRP threshold for LOS detection may then be set according to a predetermined PL value below which a LOS path is likely to exist. In one embodiment, the predetermined PL value is such that a PL that is less than the predetermined PL value is indicative that it is more likely than not that the is a LOS path between the base station 12-1 and the wireless device 16-1. Further, the PL value may be fine tuned to provide a desired confidence level (e.g., 50%, 60%, 70%, 80%, or 90%). Note that as the confidence level increases, the number of false positives decreases but the number of false negatives increases (i.e., the number of incorrect LOS detections decreases but the number of incorrect non-LOS detections increases). Thus, the selection of the PL value can vary depending on the particular implementation.

As an example of setting the predetermined RSRP threshold for LOS detection based on the PL, consider a scenario where it is known to a network operator of the cellular communications network 10 or a system designer that any PL less than 60 decibels (dB) corresponds to a LOS path. Then, if, for example, $TxPower_{BS}$ is equal to 23 decibel-milliwatts (dBm) for a low power base station, $AntennaGain_{BS}$ is equal to 12 dB, and $\epsilon$ is equal to 0, the predetermined RSRP threshold value can be set to −25 dBm. As a result, if $RSRP_{SERVING}$ is greater than or equal to −25 dBm, it is a good indication that a LOS path exists between the base station 12-1 and the wireless device 16-1. Otherwise, it is a good indication that a LOS path does not exist between the base station 12-1 and the wireless device 16-1.

If $RSRP_{SERVING}$ is not greater than or equal to the predetermined RSRP threshold for LOS detection, the process proceeds to step 126. However, if $RSRP_{SERVING}$ is greater than or equal to the predetermined RSRP threshold for LOS detection, then the base station 12-1 obtains a Timing Advance (TA) value for uplink transmissions from the wireless device 16-1 to the base station 12-1 (step 108). For LTE, the TA value is a value that is specific to the wireless device 16-1 and, more specifically, is a timing offset for the uplink transmissions from the wireless device 16-1 that provides proper time-alignment when the uplink transmissions are received by the base station 12-1. The TA value is determined by the base station 12-1 and signaled to the wireless device 16-1. The base station 12-1 then compares the TA value for the wireless device 16-1 to a predetermined TA threshold for LOS detection (step 110). The predetermined TA threshold for LOS detection is such that a TA value that is less than or equal to the predetermined TA threshold is an indication that it is likely that there is a LOS path between the base station 12-1 and the wireless device 16-1. Further, the predetermined TA threshold may be fine tuned to provide a desired confidence level (e.g., 50%, 60%, 70%, 80%, or 90%). Note that as the confidence level increases, the number of false positives decreases but the number of false negatives increases (i.e., the number of incorrect LOS detections decreases but the number of incorrect non-LOS detections increases). Thus, the selection of the predetermined TA threshold can vary depending on the particular implementation. As an example, the predetermined TA threshold can be 700 microseconds, which corresponds to 21 meters.

If the TA value for the wireless device 16-1 is not less than or equal to the predetermined TA threshold for LOS detection, the process proceeds to step 126. However, if the TA value for the wireless device 16-1 is less than or equal to the predetermined TA threshold for LOS detection, the base station 12-1 then obtains a distance between the base station 12-1 and the wireless device 16-1 (step 112). The distance between the base station 12-1 and the wireless device 16-1 can be obtained using any desired technique. In one embodiment, in LTE, positioning information for the wireless device 16-1 is provided to the base station 12-1 in the 3GPP Technical Specification (TS) 36.331 Information Element (IE) "Location Info." If the "confidence" in the IE Location Info is greater than a predetermined threshold, then the location of the wireless device 16-1, which can be expressed in geographic coordinates, can be used to determine the distance between the base station 12-1 and the wireless device 16-1. The base station 12-1 then compares the distance between the base station 12-1 and the wireless device 16-1 to a predetermined distance threshold for LOS detection (step 114). The predetermined distance threshold is such that a distance that is less than or equal to the predetermined distance threshold is an indicator that it is likely that there is a LOS path between the base station 12-1 and the wireless device 16-1. Further, the predetermined distance threshold may be fine tuned to provide a desired confidence level (e.g., 50%, 60%, 70%, 80%, or 90%). Note that as the confidence level increases, the number of false positives decreases but the number of false negatives increases (i.e., the number of incorrect LOS detections decreases but the number of incorrect non-LOS detections increases). Thus, the selection of the predetermined distance threshold can vary depending on the particular implementation.

If the distance is not less than or equal to the predetermined distance threshold, the process proceeds to step 126. However, if the distance is less than or equal to the predetermined distance threshold, the base station 12-1 obtains a Root Mean Squared Error (RMSE) between a closest Rayleigh Probability Density Function (PDF) from a set of Rayleigh PDFs having different maximum likelihood values and RSRP samples obtained for a link between the base station 12-1 and the wireless device 16-1 (step 116). More specifically, a mathematical representation of a Rayleigh PDF is:

$$f(x; \sigma) = \frac{x}{\sigma^2} e^{-x^2/2\sigma^2}; x \geq 0,$$

for σ>0, where σ is a maximum likelihood. A best-fit analysis is performed to select a Rayleigh PDF from a set of Rayleigh PDFs having different maximum likelihood values. The best-fit analysis is such that the Rayleigh PDF that is selected from the set is the one that most closely matches the RSRP samples for the link between the base station 12-1 and the wireless device 16-1. The RMSE is then computed for a difference between the selected, or closest, Rayleigh PDF and the RSRP samples. Note that while RSRP samples are used in this example, other Received Signal Strength (RSS) samples may be used (e.g., RSSI samples). Further note that the number of RSRP samples may vary depending on the desired level of accuracy. As one example, the number of RSRP samples may be greater than or equal to 2,500 RSRP samples or a number of RSRP samples in a range of and including 2,500 to 3,000 RSRP samples.

The base station 12-1 then compares the RMSE between the closest Rayleigh PDF and the RSRP samples obtained in step 116 to a predetermined RMSE threshold for LOS detection (step 118). The predetermined RMSE threshold for LOS detection is set such that an RMSE value that is less than the predetermined RMSE threshold is an indicator that it is likely that there is a LOS path between the base station 12-1 and the wireless device 16-1. Further, the predetermined RMSE threshold may be fine tuned to provide a desired confidence level (e.g., 50%, 60%, 70%, 80%, or 90%). Note that as the confidence level increases, the number of false positives decreases but the number of false negatives increases (i.e., the number of incorrect LOS detections decreases but the number of incorrect non-LOS detections increases). Thus, the selection of the RMSE threshold can vary depending on the particular implementation.

If the RMSE obtained in step 116 is greater than or equal to the predetermined RMSE threshold, the process proceeds to step 126. Otherwise, the base station 12-1 obtains a correlation, or more specifically a cross-correlation, between corresponding received signals from two antennas of the base station 12-1 for a radio signal transmitted by the wireless device 16-1 (step 120). In this particular embodiment, the base station 12-1 is equipped with at least two antennas. The two antennas used for step 120 are orthogonal to one another (e.g., ±45°) and the corresponding received signals obtained from the two antennas are measured within the same narrow bandwidth, W. In one embodiment, envelopes ($Y_1$ and $Y_2$) of the corresponding received signals from the two antennas are used to compute the correlation between the corresponding received signals. Preferably, measurement of the envelopes ($Y_1$ and $Y_2$) is calibrated in such as way that each of the envelopes ($Y_1$ and $Y_2$) has a zero mean.

The base station 12-1 then compares the correlation obtained in step 120 to a predetermined cross-correlation (XCOR) threshold for LOS detection (step 122). The predetermined cross-correlation threshold is set such that a correlation value that is less than the predetermined cross-correlation threshold is an indication that it is likely that a LOS path exists between the base station 12-1 and the wireless device 16-1. Further, the predetermined cross-correlation threshold may be fine tuned to provide a desired confidence level (e.g., 50%, 60%, 70%, 80%, or 90%). Note that as the confidence level increases, the number of false positives decreases but the number of false negatives increases (i.e., the number of incorrect LOS detections decreases but the number of incorrect non-LOS detections increases). Thus, the selection of the predetermined cross-correlation threshold can vary depending on the particular implementation.

If the predetermined cross-correlation threshold is greater than or equal to the correlation obtained in step 120, the base station 12-1 determines that a LOS path exists between the base station 12-1 and the wireless device 16-1 (step 124). Note, however, that this is not an absolute determination that the wireless device 16-1 is in fact within LOS of the base station 12-1. Rather, if the process reaches step 124, the base station 12-1 has determined that it is very likely that a LOS path exists between the base station 12-1 and the wireless device 16-1. In other words, if the process reaches step 124, the base station 12-1 has determined, with a requisite degree of certainty but not necessarily an absolute degree of certainty, that the wireless device 16-1 is within LOS of the base station 12-1. Conversely, if any of the decisions in steps 102, 106, 110, 114, 118, or 122 is negative, then the base station 12-1 determines that the wireless device 12-1 is not within LOS of the base station 12-1 (step 126). Again, reaching step 126 is not an absolute determination that there is not a LOS path between the wireless device 16-1 and the base station 12-1. There may be scenarios where a LOS path exists, but the base station 12-1 was not able to determine that the LOS path exists with the requisite degree of certainty (i.e., one of the thresholds in steps 102, 106, 110, 114, 118, or 122 was not satisfied).

As mentioned above, the ordering of the steps of FIGS. 2A and 2B is not critical. The steps can be re-arranged in any suitable manner. Further, not all of the steps are necessary. In particular, any combination of steps 100/102, 104/106, 108/110, 112/114, 116/118, and 120/122 can be used. In one embodiment, any two or more of steps 100/102, 104/106, 108/110, 112/114, 116/118, and 120/122 are used to make a LOS determination (e.g., steps 100/102 and steps 116/118).

In another embodiment, any three or more of steps 100/102, 104/106, 108/110, 112/114, 116/118, and 120/122 are used to make a LOS determination (e.g., steps 100/102, steps 116/118, and steps 120/122). In another embodiment, any four or more of steps 100/102, 104/106, 108/110, 112/114, 116/118, and 120/122 are used to make a LOS determination (e.g., steps 100/102, steps 108/110, steps 116/118, and steps 120/122). In another embodiment, any five or more of steps 100/102, 104/106, 108/110, 112/114, 116/118, and 120/122 are used to make a LOS determination (e.g., steps 100/102, steps 104/106, steps 108/110, steps 116/118, and steps 120/122). In yet another embodiment, all of the steps 100/102, 104/106, 108/110, 112/114, 116/118, and 120/122 are used to make a LOS determination.

The LOS determination made using the process of FIGS. 2A and 2B can be used in any desired manner. For example, LOS determination may be used by the cellular communications network 10 to provide a desired feature (e.g., positioning of the wireless device 16-1 using Time of Arrival (TOA) and/or Direction of Arrival (DOA) technique(s)). In addition or alternatively, the LOS determination may be a service or Application Programming Interface (API) provided to a third-party network operator.

Figure 3:
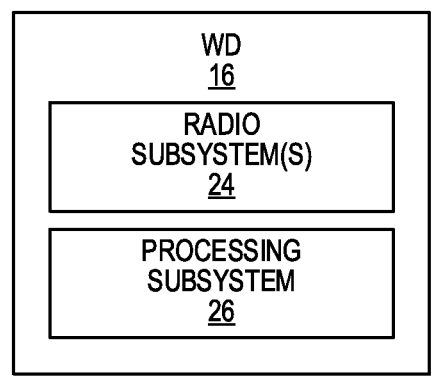
FIG. 3 is a block diagram of one of the wireless devices of FIG. 1 according to one embodiment of the present disclosure.

FIG. 3 is a block diagram of one of the wireless devices 16 of FIG. 1 according to one embodiment of the present disclosure. As illustrated, the wireless device 16 includes one or more radio subsystems 24 and a processing subsystem 26. The one or more radio subsystems 24 generally include analog and, in some embodiments, digital components for sending and receiving data to and from the base stations 12. In particular embodiments, each of the one or more radio subsystems 24 may represent or include one or more Radio Frequency (RF) transceivers, or separate RF transmitter(s) and receiver(s), capable of transmitting suitable information wirelessly to and receiving suitable information from other network components or nodes. From a wireless communications protocol view, the one or more radio subsystems 24 implement at least part of Layer 1 (i.e., the Physical or "PHY" Layer).

The processing subsystem 26 generally implements any remaining portion of Layer 1 as well as functions for higher layers in the wireless communications protocol (e.g., Layer 2 (data link layer), Layer 3 (network layer), etc.). In particular embodiments, the processing subsystem 26 may comprise, for example, one or several general-purpose or special-purpose microprocessors or other microcontrollers programmed with suitable software and/or firmware to carry out some or all of the functionality of the wireless device 16 described herein. In addition or alternatively, the processing subsystem 26 may comprise various digital hardware blocks (e.g., one or more Application Specific Integrated Circuits (ASICs), one or more off-the-shelf digital and analog hardware components, or a combination thereof) configured to carry out some or all of the functionality of the wireless device 16 described herein. Additionally, in particular embodiments, the above described functionality of the wireless device 16 may be implemented, in whole or in part, by the processing subsystem 26 executing software or other instructions stored on a non-transitory computer-readable medium, such as Random Access Memory (RAM), Read Only Memory (ROM), a magnetic storage device, an optical storage device, or any other suitable type of data storage components. Of course, the detailed operation for each of the functional protocol layers, and thus the one or more radio subsystems 24 and the processing subsystem 26, will vary depending on both the particular implementation as well as the standard or standards supported by the wireless device 16.

Figure 4:
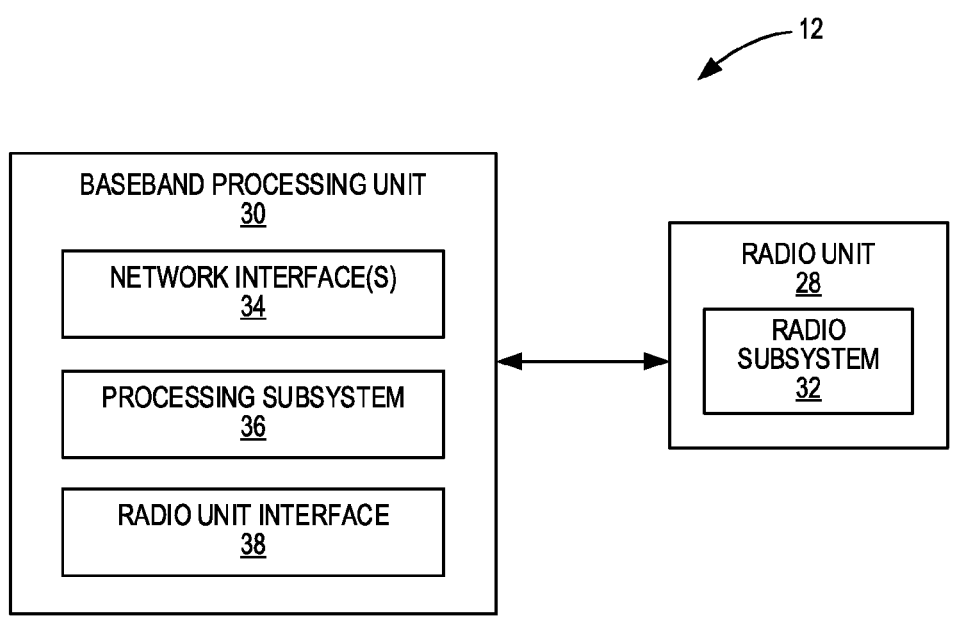
FIG. 4 is a block diagram of one of the base stations of FIG. 1 according to one embodiment of the present disclosure.

FIG. 4 is a block diagram of one of the base stations 12 of FIG. 1 according to one embodiment of the present disclosure. As illustrated, the base station 12 includes a radio unit 28 and a baseband processing unit 30. While only one radio unit 28 is illustrated, the base station 12 may include multiple radio units 28 (e.g., one radio unit 28 per sector). The radio unit 28 generally includes analog and, in some embodiments, digital components for sending and receiving data to and from wireless devices 16 within the corresponding cell 14. In particular embodiments, the radio unit 28 may represent or include one or more RF transceiver(s), or separate RF transmitter(s) and receiver(s), capable of transmitting suitable information wirelessly to and receiving suitable information from other network components or nodes. From a wireless communications protocol view, the radio unit 28 implements at least part of Layer 1 (i.e., the Physical or "PHY" Layer). In particular, the radio unit 28 includes a radio subsystem 32 that includes a transmitter and a receiver.

The baseband processing unit 30 includes one or more network interfaces 34, a processing subsystem 36, and a radio unit interface 38. The network interface(s) 34 provide network connectivity to other base stations 12 (e.g., an X2 interface) and network connectivity to a corresponding S-GW 20 and MME 22 (e.g., S1 interfaces). The processing subsystem 36 generally implements any remaining portion of Layer 1 not implemented in the radio unit 28 as well as functions for higher layers in the wireless communications protocol (e.g., Layer 2 (data link layer), Layer 3 (network layer), etc.). In particular embodiments, the processing subsystem 36 may comprise, for example, one or several general-purpose or special-purpose microprocessors or other microcontrollers programmed with suitable software and/or firmware to carry out some or all of the functionality of the base station 12 described herein. In addition or alternatively, the processing subsystem 36 may comprise various digital hardware blocks (e.g., one or more ASICs, one or more off-the-shelf digital and analog hardware components, or a combination thereof) configured to carry out some or all of the functionality of the base station 12 described herein. Additionally, in particular embodiments, the above described functionality of the base station 12 may be implemented, in whole or in part, by the processing subsystem 36 executing software or other instructions stored on a non-transitory computer-readable medium, such as RAM, ROM, a magnetic storage device, an optical storage device, or any other suitable type of data storage components. Lastly, the base station 12 includes the radio unit interface 38. The radio unit interface 38 provides an interface between the baseband processing unit 30 and the radio unit 28. It should be noted that, of course, the detailed operation of the network interface(s) 34, the processing subsystem 36, and the radio unit interface 38 may vary depending on both the particular implementation as well as the standard or standards supported by the base station 12.

The following acronyms are used throughout this disclosure.

3GPP 3$^{rd}$ Generation Partnership Project
API Application Programming Interface
ASIC Application Specific Integrated Circuit
BS Base Station
CRS Cell-Specific Reference Symbols
dB Decibel
dBm Decibel-Milliwatt DOA Direction of Arrival
GPRS General Packet Radio Service
GPS Global Positioning System
GSM Global System for Mobile Communications
HSPA High Speed Packet Access
IE Information Element
LOS Line of Sight
LTE Long Term Evolution
MME Mobility Management Entity
NLOS Non Line of Sight
PDF Probability Density Function
PL Path Loss
RAM Random Access Memory
RAN Radio Access Network
RF Radio Frequency
ROM Read Only Memory
RSRP Reference Signal Received Power
RSS Received Signal Strength
RSSI Received Signal Strength Indicator
S-GW Serving Gateway
TA Timing Advance
TOA Time of Arrival
TS Technical Specification
WD Wireless Device
XCOR Cross-Correlation Those skilled in the art will recognize improvements and modifications to the preferred embodiments of the present disclosure. All such improvements and modifications are considered within the scope of the concepts disclosed herein and the claims that follow.

What is claimed is:

1. A method of operation of a network node in a cellular communications network to detect whether a wireless device is within line of sight of a base station of the cellular communications network, comprising:
   performing at least one operation selected from a group consisting of:
      comparing a Ricean factor of a wireless communications channel between the base station and the wireless device with a predetermined Ricean factor threshold for line of sight detection; and
      comparing a root mean squared error between a Rayleigh probability density function and samples of a received signal strength for radio signals transmitted between the base station and the wireless device with a predetermined root mean squared error threshold for line of sight detection;
   performing a best-fit analysis to select the Rayleigh probability density function from a plurality of Rayleigh probability density functions for different maximum likelihood values based on the samples of the received signal strength for the radio signals transmitted between the base station and the wireless device; and
   determining whether the wireless device is within line of sight of the base station based on results of the at least one operation.

2. The method of claim 1 further comprising:
performing one or more additional operations selected from a group comprising:
   comparing a received signal strength for radio signals transmitted from the base station to the wireless device with a predetermined received signal strength threshold for line of sight detection;
   comparing a timing advance value for uplink transmissions from the wireless device to the base station with a predetermined timing advance threshold for line of sight detection;
   comparing a physical distance between the base station and the wireless device with a predetermined distance threshold for line of sight detection; and
   comparing a correlation between a first received signal received by a first antenna of the base station and a second received signal received by a second antenna of the base station with a predetermined correlation threshold for line of sight detection;
wherein determining whether the wireless device is within line of sight of the base station is further based on results of the one or more additional operations.

3. The method of claim 1 further comprising:
performing an additional operation that includes comparing a correlation between a first received signal received by a first antenna of the base station and a second received signal received by a second antenna of the base station to a predetermined correlation threshold for line of sight detection;
wherein determining whether the wireless device is within line of sight of the base station is further based on a result of the additional operation.

4. The method of claim 1 further comprising:
performing an additional operation that includes comparing a received signal strength for a radio signal transmitted between the base station and the wireless device with a predetermined received signal strength threshold for line of sight detection;
wherein determining whether the wireless device is within line of sight of the base station is further based on a result of the additional operation.

5. The method of claim 1 further comprising:
performing an additional operation that includes comparing a timing advance value for uplink transmissions from the wireless device to the base station with a predetermined timing advance threshold for line of sight detection;
wherein determining whether the wireless device is within line of sight of the base station is further based on a result of the additional operation.

6. The method of claim 1 further comprising:
performing an additional operation that includes comparing a physical distance between the base station and the wireless device with a predetermined distance threshold for line of sight detection;
wherein determining whether the wireless device is within line of sight of the base station is further based on a result of the additional operation.

7. The method of claim 1 further comprising:
performing three or more additional operations selected from a group consisting of:
   comparing a received signal strength for radio signals transmitted from the base station to the wireless device with a predetermined received signal strength threshold for line of sight detection;
   comparing a timing advance value for uplink transmissions from the wireless device to the base station with a predetermined timing advance threshold for line of sight detection;
   comparing a physical distance between the base station and the wireless device with a predetermined distance threshold for line of sight detection; and
   comparing a correlation between a first received signal received by a first antenna of the base station and a second received signal received by a second antenna of the base station with a predetermined correlation threshold for line of sight detection;

wherein determining whether the wireless device is within line of sight of the base station is further based on results of the three or more additional operations.

8. A network node in a cellular communications network, comprising:

a radio subsystem configured to provide a wireless interface to a wireless device; and a processing subsystem associated with the radio subsystem configured to:

perform at least one operation selected from a group consisting of:

comparing a Ricean factor of a wireless communications channel between a base station and the wireless device with a predetermined Ricean factor threshold for line of sight detection; and comparing a root mean squared error between a Rayleigh probability density function and samples of a received signal strength for radio signals transmitted between the base station and the wireless device with a predetermined root mean squared error threshold for line of sight detection;

perform a best-fit analysis to select the Rayleigh probability density function from a plurality of Rayleigh probability density functions for different maximum likelihood values based on the samples of the received signal strength for the radio signals transmitted between the base station and the wireless device; and determine whether the wireless device is within line of sight of the base station based on results of the at least one operation.

9. The network node of claim 8 wherein the processing subsystem is further configured to:

perform an additional operation that includes comparing a correlation between a first received signal received by a first antenna of the base station and a second received signal received by a second antenna of the base station with a predetermined correlation threshold for line of sight detection; and determine whether the wireless device is within line of sight of the base station further based on a result of the additional operation.

10. The network node of claim 8 wherein the processing subsystem is further configured to:

perform an additional operation that includes comparing the received signal strength for the radio signals transmitted from the base station to the wireless device with a predetermined received signal strength threshold for line of sight detection; and determine whether the wireless device is within line of sight of the base station further based on a result of the additional operation.

11. The network node of claim 8 wherein the processing subsystem is further configured to:

perform an additional operation that includes comparing a timing advance value for uplink transmissions from the wireless device to the base station with a predetermined timing advance threshold for line of sight detection; and determine whether the wireless device is within line of sight of the base station further based on a result of the additional operation.

12. The network node of claim 8 wherein the processing subsystem is further configured to:

perform an additional operation that includes comparing a physical distance between the base station and the wireless device with a predetermined distance threshold for line of sight detection; and determine whether the wireless device is within line of sight of the base station further based on a result of the additional operation.

* * * * *